(12) United States Patent
Karmhag et al.

(10) Patent No.: US 7,872,791 B2
(45) Date of Patent: Jan. 18, 2011

(54) ELECTROCHROMIC DEVICE CONTACTING

(75) Inventors: Richard Karmhag, Uppsala (SE); Greger Gustavsson, Uppsala (SE)

(73) Assignee: Chromogenics Sweden AB, Uppsala (SE)

( * ) Notice: Subject to any disclaimer, the term of this patent is extended or adjusted under 35 U.S.C. 154(b) by 0 days.

(21) Appl. No.: 12/375,468

(22) PCT Filed: Jul. 25, 2007

(86) PCT No.: PCT/SE2007/050536

§ 371 (c)(1),
(2), (4) Date: Apr. 28, 2009

(87) PCT Pub. No.: WO2008/013501

PCT Pub. Date: Jan. 31, 2008

(65) Prior Publication Data

US 2009/0303565 A1     Dec. 10, 2009

(30) Foreign Application Priority Data

Jul. 28, 2006   (SE) .................................. 0601621

(51) Int. Cl.
*G02F 1/15* (2006.01)
*G02F 1/153* (2006.01)
(52) U.S. Cl. .................. 359/265; 359/273; 359/900
(58) Field of Classification Search ......... 359/265–275, 359/900
See application file for complete search history.

(56) References Cited

U.S. PATENT DOCUMENTS

| | | | |
|---|---|---|---|
| 4,465,340 A | 8/1984 | Suganuma |
| 4,702,566 A | 10/1987 | Tukude |
| 5,054,895 A | 10/1991 | Minoura et al. |
| 5,206,748 A | 4/1993 | Yamazaki |
| 6,500,287 B1 | 12/2002 | Azens et al. |
| 2003/0214695 A1 | 11/2003 | Abramson et al. |
| 2004/0218247 A1 | 11/2004 | Tonar et al. |

FOREIGN PATENT DOCUMENTS

WO      99/23528      5/1999

OTHER PUBLICATIONS

International Search Report dated Nov. 6, 2007, from corresponding PCT application.
European Search Report in Corresponding Application No. 07794146 Dated Jan. 28, 2010.

*Primary Examiner*—Jack Dinh
(74) *Attorney, Agent, or Firm*—Young & Thompson

(57) ABSTRACT

An electrochromic device (50) includes at least the typical five layer stack (12, 14, 16, 18, 20) between two substrates (22, 24) and connections elements (42, 44, 66) to the electron conducting layers (12, 14). At least one of the connections elements (42, 44, 66) are arranged through the substrate (22, 24). In preferred embodiments the points where the connection elements (42, 44, 66) penetrate the substrates are situated at different lateral positions. The substrates (22, 24) are typically plastic substrates. In another aspect of the invention, a manufacturing method providing an electrochromic device (50) according to the above described principles is provided.

16 Claims, 11 Drawing Sheets

ELECTROCHROMIC DEVICE CONTACTING

TECHNICAL FIELD

The present invention relates in general to electrochromic devices and manufacturing thereof, and in particular to contacting of electrochromic devices.

BACKGROUND

A typical electrochromic device comprises at least five superimposed layers deposited on one substrate or positioned between two substrates in a joined together configuration. The central part of the five-layer electrochromic stack an ion conductor (e.g. an electrolyte). The ion conductor is in contact with an electrochromic film, capable of conducting electrons as well as ions. On the other side of the ion conductor is an electron and ion conducting counter electrode film serving as an ion storage layer. The central three-layer structure is positioned between electron conducting layers. Such a device is colored/bleached by applying an external voltage pulse between the electron conducting layers on the two sides of the stack, causing the electrons and ions to move between the electrochromic layer and the counter electrode layer. Applications of electrochromic devices include architectural windows, information displays, light filters and modulators, rearview mirrors, sunroofs and windows in vehicles, eyewear, helmet visors, ski goggles, surfaces with variable thermal emissivity or camouflage.

Historically, the first electrochromic coatings were deposited on glass substrates. The possibility of using plastic substrates is described, for example, in WO9923528. Electrochromic devices on plastic substrates are characterized by their light weight, flexibility, and the ease of cutting to complex shapes.

As mentioned above, the electrochromic device is operated by applying a voltage between the two electron conducting layers. In order to do this, the electron conducting layers have to be electrically contacted in some way. A typical thickness of the electron conducting layers is in the range of 50-400 nm, which means that the layers themselves do not have the mechanical strength of supporting any mechanical forces. Another aspect is the lateral distribution of the applied of voltage, influencing the homogeneity of the device operation. Improved homogeneity is typically achieved by adding e.g. a bus bar to the electrochromic stack in electrical connection with the electron conducting layer.

A typical procedure in prior art for contacting the electron conducting layers in a thin electrochromic device is to provide an electrically conducting means in contact with the electron conducting layers and/or a portion of a bus bar. The electron conducting layers are typically allowed to protrude outside the actual side of the operational electrochromic device, i.e. through the edge seal of the stack of layers of the electrochromic device, and the connection to the connection means is performed outside the stack. Another approach is to let parts of the connection means extend into the actual electrochromic stack, primarily for thick devices. Typical examples can be found in the published US patent application 2004/0218247. For thicker substrates, the bus bars can also continue around the side edge of the device, whereby contacting can be performed at the side edges.

SUMMARY

One problem with prior art electrochromic devices is that there are often problems in providing simple, robust and aesthetically attractive means for connecting the electrochromic devices. If e.g. the bus bars pass the edge sealing, the sealing and contacting has to be performed very carefully in order to avoid damaging the bus bars. The upper and lower substrates have to be cut in different shapes, or be displaced with respect to each other, at least one point to enable the connection to the electron conducting layers and/or bus bars. For devices with congruent substrate shapes, e.g. as cut out from a larger laminate, the side of the device must be separated at some point to enable penetration of any connection means into the stack. This increases the risk for creating e.g. trapped air pockets, even microscopic ones, that may move during switching creating optical defects inside the device. The stack of layers of the electrochromic device may also be more sensitive for flaking off or any other mechanical damage in areas around the protruding connection leads. Further problems with some prior art manufacturing methods are that the provision of the seal often adds substance to the thickness of the device and in many cases also produces a non-functioning or badly functioning part along the periphery.

A general object of the present invention is to provide electrochromic devices with improved electrical connections, and manufacturing methods therefor. A further object is to provide electrical connections of electrochromic devices that do not influence the side seal of the electrochromic device.

The above objects are achieved by devices and methods according to the enclosed patent claims. In general words, an electrochromic device comprises at least the typical five layer stack between two substrates and connections means to the electron conducting layers. At least one of the connections means are arranged through one of the substrates. In a particular embodiment the connections means are arranged through the substrate opposite to the electron conducting layer it is connected to. In another particular embodiment, the connections means are arranged through the substrate closest to the electron conducting layer it is connected to. In one particular embodiment, both connections means are arranged in the same way, in another particular embodiment, the connections means are arranged in different ways.

In preferred embodiments, the points where the connection leads penetrate the substrates are situated at different lateral positions. The substrates are typically plastic substrates.

In another aspect of the invention, a manufacturing method is provided. The method comprises typical steps for manufacturing of the layer stack of electrochromic devices and further steps for attaching connection means to the electron conducting layers. A penetration opening is provided in at least one of the substrates and a connection means is attached to the requested electron conducting layer, in one embodiment the opposite side one, in another embodiment the closest one, through that penetration opening. In one embodiment, both electron conducting layers are electrically attached in the same way, in another embodiment the electron conducting layers are electrically attached in different ways.

In different embodiments, the penetration openings are provided at different stages during the manufacturing of the layer stack. In preferred embodiments the penetration openings are situated at different lateral positions. In different embodiments the penetration openings are provided by melting, laser ablation, drilling, cutting or punching, or the substrate can be originally manufactured having an internal penetration opening.

One advantage with the present invention is that attachment of connection means to the electron conducting layers are provided in a mechanically robust manner without influencing the reliability of the edge seal of the electrochromic device.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the present disclosures, equal or directly corresponding features in different figures and embodiments will be denoted by the same reference numbers.

Electrochromic materials are in the present disclosure defined as materials that are able to change their optical properties, persistently and reversibly, under insertion/extraction of ions and electrons. An electrochromic layer is subsequently a layer comprising an electrochromic material.

Figure 1:
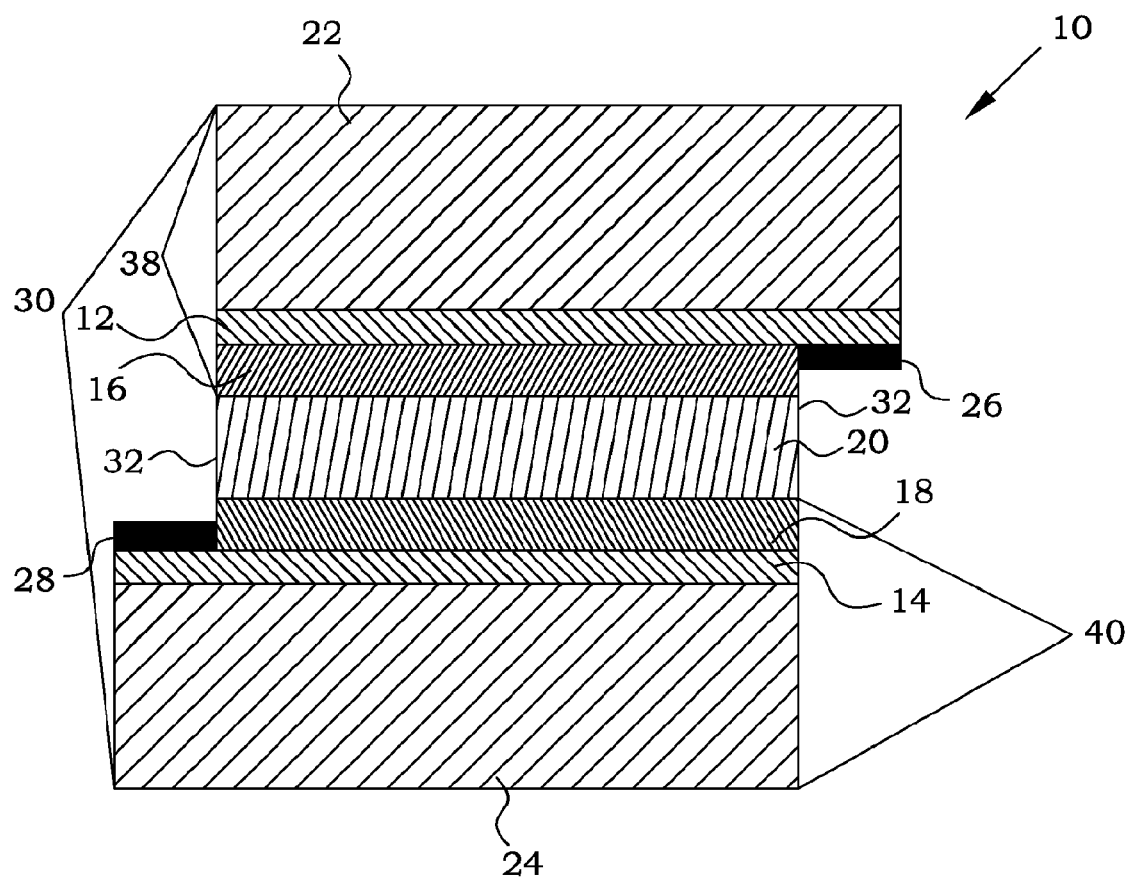
FIG. 1 is a schematic illustration of a typical composition of an electrochromic device.

FIG. 1 illustrates a typical configuration of an electrochromic device 10. In the centre part, an ion conductor, i.e. an electrolyte layer 20 is provided. The electrolyte layer 20 is on one side in contact with an electrochromic layer 16, capable of conducting electrons as well as ions. On the other side of the ion conductor 20 is an electron and ion conducting counter electrode layer 18, serving as an ion storage layer. This counter electrode film 18 may entirely or partly be constituted by a second electrochromic film. The central three-layer structure 16, 18, 20 is positioned between electron conducting layers 12, 14. The electron conducting layers 12, 14 are arranged against outer substrates, in the present invention a first 22 and a second 24 substrate, typically plastic substrate. The stack of the substrates 22, 24 and the central five layers 12, 14, 16, 18, 20 forms an electrochromic laminate sheet 30.

Note that the relative thicknesses of the layers in the different figures in the present disclosure do not represent the true relationship in dimensions. Typically, the substrates are much thicker than the other layers. The figures are drawn only for the purpose to illustrate connection principles, not to give any dimensional information.

An "electrochromic half cell" 38, 40 consists of at least a substrate material coated with an electron conducting layer and an electrochromic layer or a counter electrode.

Such an electrochromic device 10 is colored/bleached by applying an external voltage pulse between the electron conducting layers 12, 14 on the two sides of the stack 30, causing the electrons and ions to move between the electrochromic layer 16 and the counter electrode layer 18. The electrochromic layer 16 will thereby change its color. Non-exclusive examples of electrochromic layers 16 are cathodically coloring thin films of oxides based on tungsten, molybdenum, niobium, titanium, lead and/or bismuth, or anodically coloring thin films of oxides, hydroxides and/or oxy-hydrides based on nickel, iridium, iron, chromium, cobalt and/or rhodium.

At least one of the substrates 22, 24 has to be transparent, in order to reveal the electrochromic properties of the electrochromic layer 16 to the surroundings. In a typical case today, plastic substrates are used. In the most general sense, a plastic substrate 22, 24 is a synthetic or semisynthetic polymerization product. The plastic substrate is commonly classified by its polymer backbone. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers Also at least one of the two electron conducting layers 12, 14 must be transparent. Non-exclusive examples of electron conductors 12, 14 transparent to visible light are thin films of Indium Tin oxide (ITO), Tin oxide, Zinc oxide, n- or p-doped Zinc oxide and Zinc oxyfluoride. Metal-based layers, such as ZnS/Ag/ZnS and carbon nanotube layers have been recently explored as well. Depending on the particular application, one or both electron conductor layers 12, 14 may be made of a metal grid.

As mentioned above, a counter electrode layer 18 may comprise electrochromic materials as well as non-electrochromic materials. Non-exclusive examples of counter electrode layers 18 are cathodically coloring electrochromic thin films of oxides based on tungsten, molybdenum, niobium, titanium, lead and/or bismuth, anodically coloring electrochromic thin films of oxides, hydroxides and/or oxy-hydrides based on nickel, iridium, iron, chromium, cobalt and/or rhodium, or non-electrochromic thin films e.g. of oxides based on vanadium and/or cerium as well as activated carbon. Also combinations of such materials can be used as a counter electrode layer 18.

The electrolyte layer 20 comprises an ion conductor material. The electrolyte layer 20 may be transparent or non-transparent, colored or non-colored, depending on the application. Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of TiO2, silica or other oxides. Some non-exclusive examples of lithium salts used are LiTFSI [lithium bis(trifluoromethane)sulfonimide], LiBF4 [lithium tetrafluoroborate], LiAsF6 [lithium hexafluoro arsenate], LiCF3SO3 [lithium trifluoromethane sulfonate], and LiClO4 [lithium perchlorate].

In FIG. 1, a connection approach according to prior art is illustrated. Here, the substrates 22, 24 are allowed to protrude outside the edge seal 32, in order to provide a mechanical support for the electron conducting layer 12, 14 and/or any bus bar in electrical contact thereto. A connection lead 26, 28 is then attached to the protruding part of the electron conducting layer 12, 14. Each such a protrusion is not present all around the device, which creates problems when performing the actual edge seal 32 since special care has to be taken not to destroy the electron conducting layer 12, 14. Furthermore, the area outside the edge seal 32 is not useful for any electrochromic operation. The connection approach of FIG. 1 is furthermore more or less impossible to implement in manufacturing processes where devices are punched out from a larger laminate sheet.

In solutions where connection leads are attached to the electron conducting layers through an edge seal of the electrochromic device, there are also problems. Since the geometrical diameter of the connection leads typically is larger than the thickness of the electron conducting layer, the electrochromic laminate sheet typically becomes distorted close to the protrusion of the connection leads. This can cause trapped air pockets and/or mechanical damage of the device edge. Note that the true dimension of the connection leads typically is much larger than the thickness of e.g. the electron conducting layer.

Figure 2A:
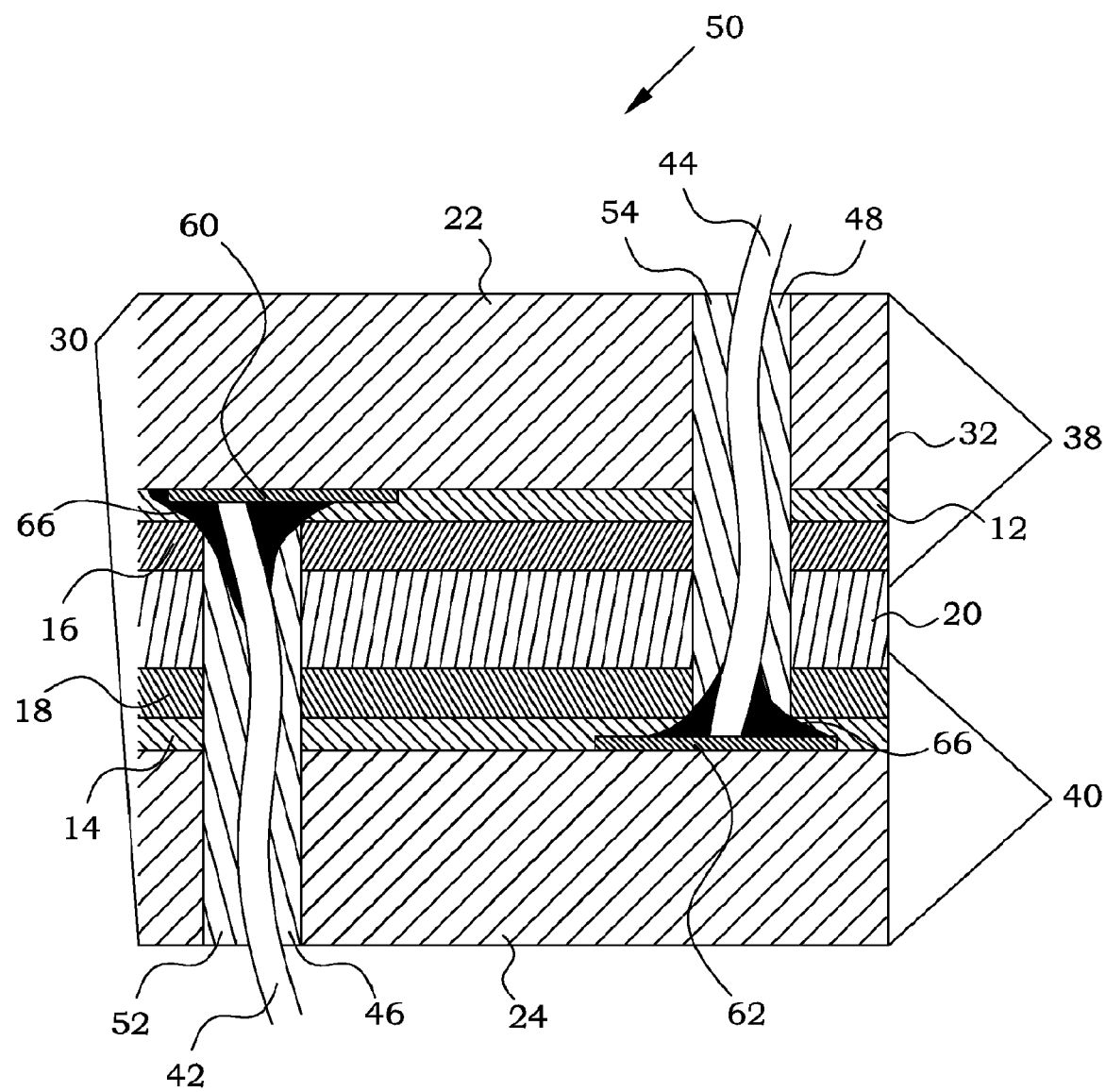
FIG. 2A is a schematic illustration of an embodiment of an electrochromic device according to the present invention.

FIG. 2A illustrates an embodiment of an electrochromic device 50 according to the present invention. The electrochromic device 50 comprises an electrochromic laminate sheet 30 basically according to previously described principles. The differences compared to FIG. 1 are mainly in the way of providing connection leads 42, 44 in electrical contact with the electron conducting layers 12, 14. A first connection lead 42 is arranged through the second substrate 24 and a second connection lead 44 is arranged through the first substrate 22. In other words, the connection leads 42, 44 are provided through the substrate being opposite to the electron conducting layer the connection lead is connected to. Note that the dimension relations in the figures are not representative of the real ones. For instance, the diameter of the connection leads 42, 44 are typically much larger than the thickness of the electron conducting layers 12, 14.

In the illustrated embodiment, a first penetration opening 46 is provided in the second substrate 24, through which the first connection lead 42 protrudes. The first connection lead 42 is attached to the first electron conducting layer 12 by an attachment, in this embodiment illustrated as a volume of attachment material 66, provided e.g. by ultrasonic soldering, other types of soldering or welding or by gluing with electron conducting glues. The volume of the first penetration opening 46 not occupied by the first connection lead 42 is filled by a sealing substance 52. Similarly, a second penetration opening 48 is provided in the first substrate 22, through which the second connection lead 44 protrudes. The second connection lead 44 is attached to the second electron conducting layer 14 by an attachment, in this embodiment illustrated as a volume of attachment material 66, provided e.g. by ultrasonic soldering, other types of soldering or welding or by gluing. The volume of the second penetration opening 48 not occupied by the second connection lead 44 is filled by a sealing substance 54.

Throughout the present disclosure, "connection means" is used as a generic term for at least one of a connection lead and a volume of attachment material, such as a solder or an electron conducting glue.

In the present embodiment, the electron conducting layers 12, 14 are composed by a transparent thin films, e.g. of Indium Tin oxide, and are furthermore provided in electrical contact with bus bars 60, 62. Preferably the connection leads 42, 44 are attached to the electron conducting layers 12, 14 at positions where a portion of the bus bar 60, 62 is present, providing an attachment of somewhat higher strength. The bus bars 60, 62 are in the present embodiment provided between the substrates 22, 24 and the electron conducting layers 12, 14, which gives a good mechanical strength to the connection lead attachment 66. However, in alternative embodiments, the bus bars may also be provided between the electron conducting layers and the electrochromic layer and counter electrode, respectively.

Figure 2B:
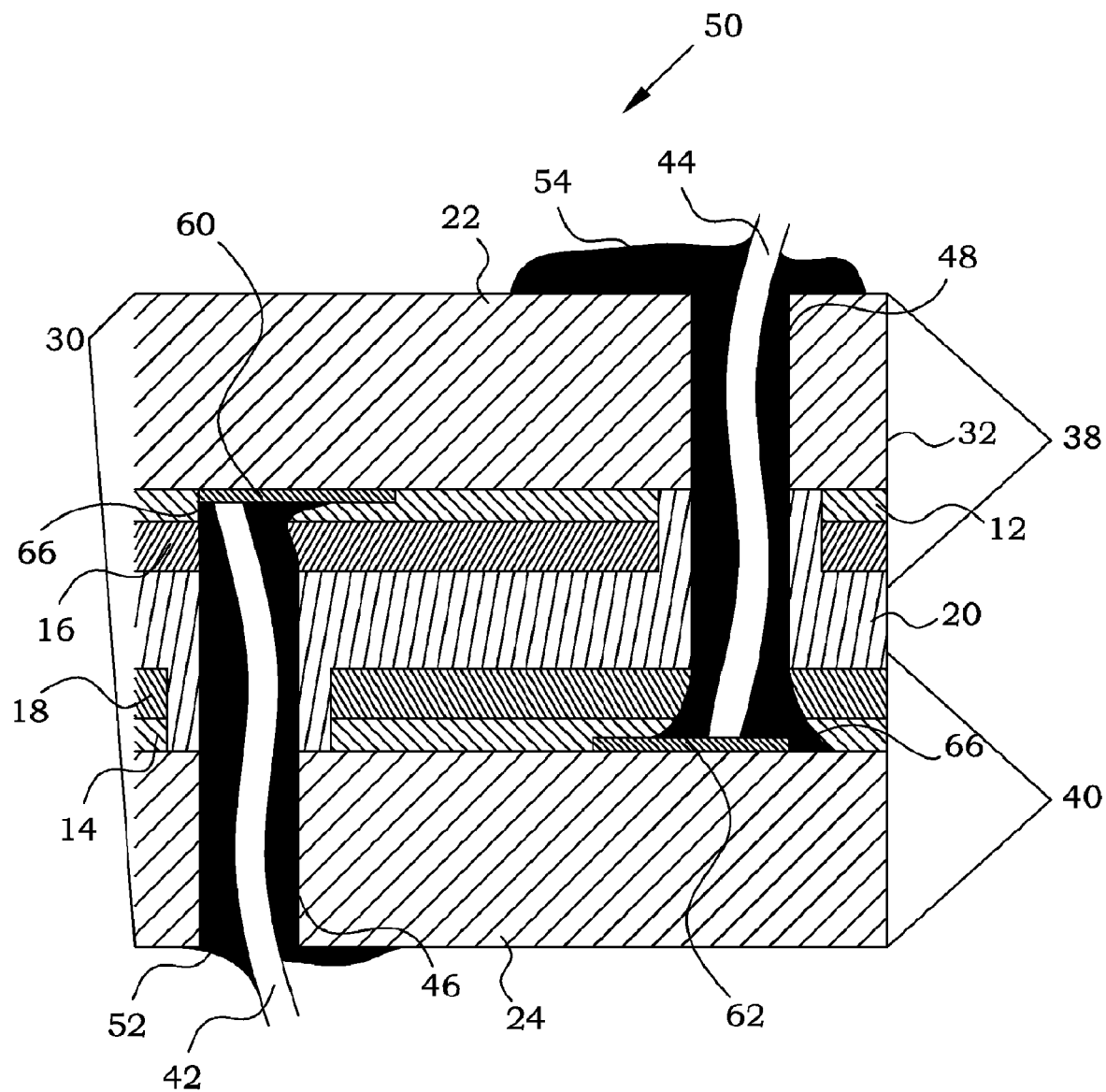
FIG. 2B is a schematic illustration of another embodiment of an electrochromic device according to the present invention.

FIG. 2B illustrates another embodiment of an electrochromic device 50 according to the present invention. In this embodiment, the volume of attachment material, e.g. a solder, is used also as sealing substance 54. The first penetration opening 46 is therefore manufactured wider in the area where it passes the electron conducting layer 14 and the counter electrode layer 18, in order to reduce the probability for electrically shortening of the device via the sealing substance 54. This can typically be provided by masking techniques in connection with the deposition of the electron conducting layer 14 and the counter electrode layer 18, respectively. Furthermore, the first penetration opening 46 ends on top of the electrochromic layer 16. The connection lead 42 has thereby to be attached to the electron conducting layer 12 through the electrochromic layer 16. This is readily achieved e.g. by ultrasonic soldering. Similarly, the second penetration opening 48 is wider in the area where it passes the electron conducting layer 12 and the electrochromic layer 16. The second penetration opening 48 ends on top of the counter electrode layer 18. The connection lead 44 is attached to the electron conducting layer 14 through the counter electrode layer 18. In such a way, the same masks can be used for all the deposited layers 12, 14, 16, and 18 if proper geometries are planned. This is discussed further below.

Figure 3A:
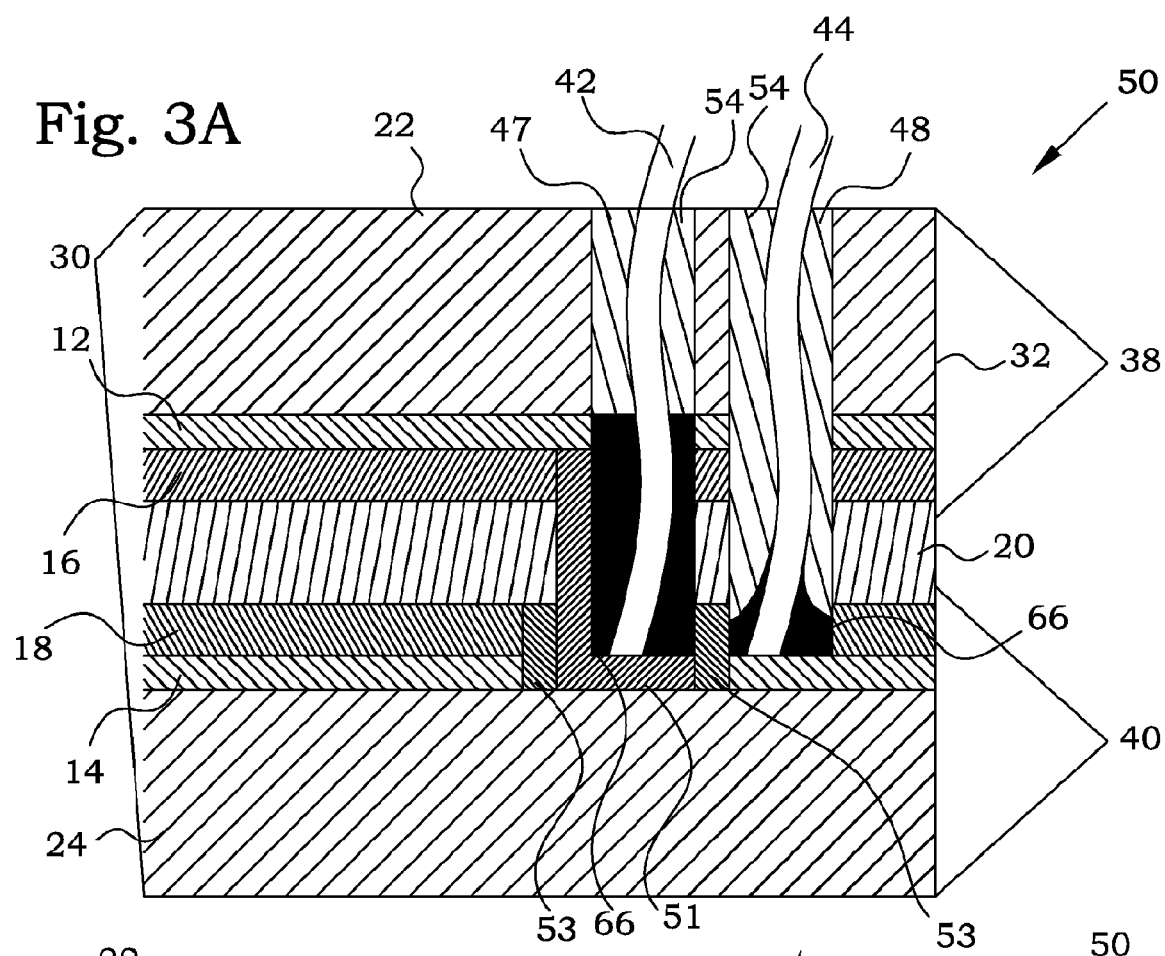
FIGS. 3A-D are schematic illustrations of other embodiments of electrochromic devices according to the present invention.

In a typical case, both connection leads 42, 44 are connected through the opposite side substrate 22, 24. However, in certain applications, it may be requested to have the connection to the conducting layers at the same side of the electrochromic device. In such a case, it is preferred to have one of the connection leads connected according to the above presented principles, while there is another arrangement for the other. FIG. 3A schematically illustrates one embodiment of such a non-symmetric connection arrangement. In FIG. 3A, it is illustrated that the second connection lead 44 goes through the first substrate 22, however, anyone skilled in the art realizes that also the opposite arrangement is feasible. The first connection lead 42 is in this particular embodiment provided essentially parallel to the second connection lead 44 through the first substrate 22. An additional penetration opening 47 is provided in the first substrate 22, through which the first connection lead 42 is arranged. The first connection lead 42 is attached to a bridge connection 51 at the place where the second conducting layer 14 normally is placed. In order to improve the electrical contact, the bottom part of the additional penetration opening 47 is sealed by a conductive sealing substance, in this embodiment a solder material 66. The excess volume of the additional penetration opening 47 is then sealed by the non-conducting sealing substance 54 used for the second penetration opening 48. The bridge connection 51 is separated from the second conducting layer by isolations 53 and is further arranged across the layer stack 30 and in electrical connection to the first conducting layer 12. Such an arrangement has to be prepared during the manufacturing of the stack itself, removing the second conducting layer 12 from certain areas, and providing the additional structures.

Figure 3B:
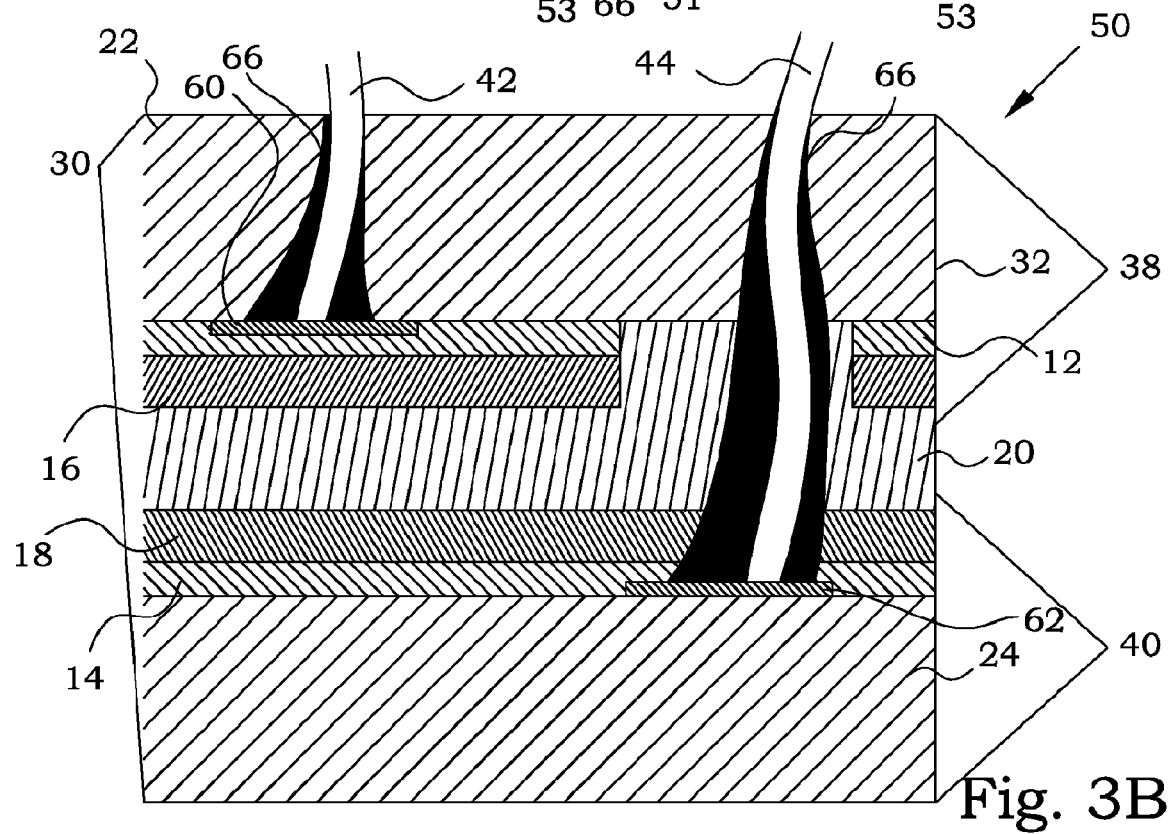

FIG. 3B schematically illustrates another embodiment of a non-symmetric connection arrangement. In this embodiment, no penetration openings are provided separately before the attachment of the connection leads 42, 44. Instead, the connection leads 42, 44 are welded to the electron conducting layers 12, 14 and thereby heated. The heated connection leads can penetrate through the substrate 22 together with solder material 66 by simply melting the substrate 22 locally. This procedure creates a second penetration opening through the substrate 22, which is completely filled by the second connection lead 44 and the solder material 66. As a precaution, the first electron conducting layer 12 and the electrochromic layer 16 are masked away on the first substrate 22 opposite to the position where the second connection lead is attached, in order to prevent any short-circuiting of the device by mistake. An additional penetration opening through the substrate 22 is also provided, completely filled by the first connection lead 42 and the solder material 66. The first connection lead 42 is attached to the first electron conducting layer 12 and/or the bus bar 60 in contact therewith. As an extra precaution, the second electron conducting layer 14 and the counter electrode 18 may be masked away on the second substrate 24 opposite to the position where the first connection lead is attached, in order to reduce any short-circuiting of the device by mistake. This is, however, not illustrated in FIG. 3B. The second connection lead 44 is attached to the second electron conducting layer 14 and/or the bus bar 60 in contact therewith. Such an embodiment has the advantage that the sealing of the penetration openings are provided inherently. One disadvantage is that the actual electrical attachment is more difficult to control.

Figure 3C:
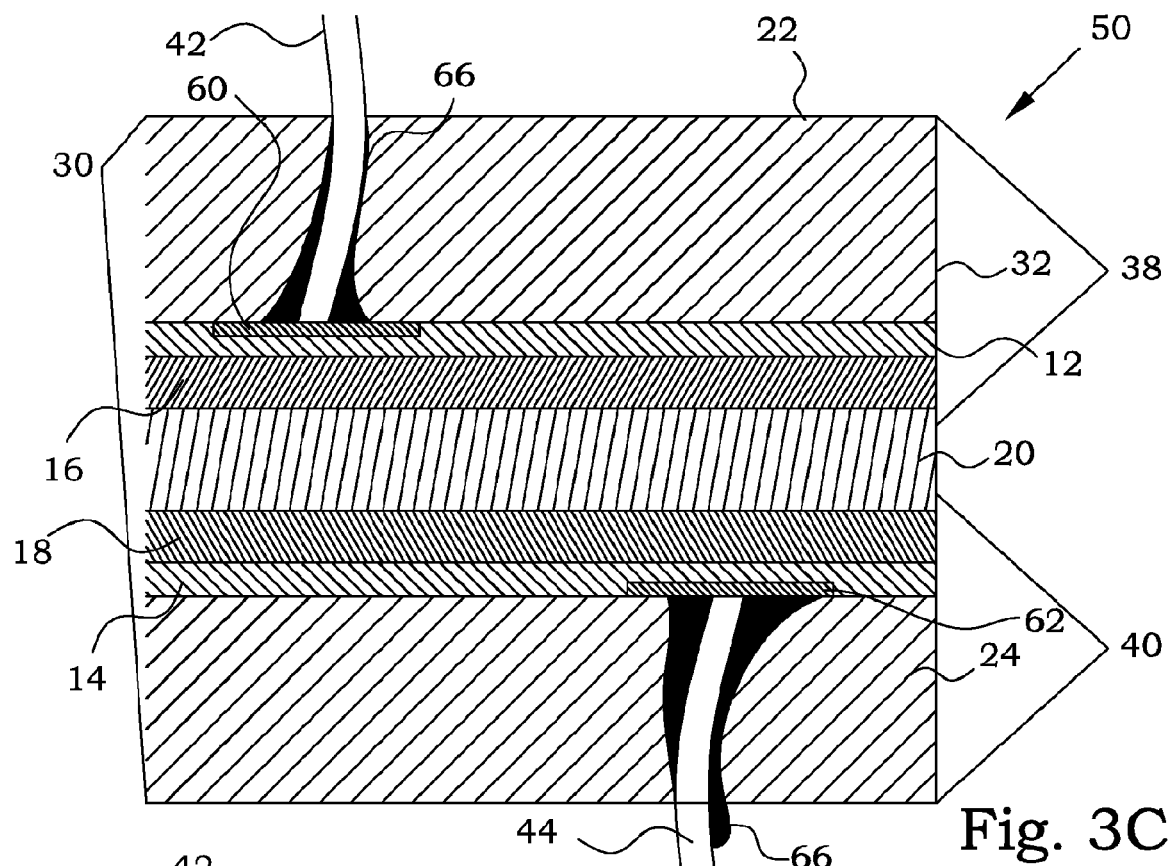

The attachment technique of FIG. 3B may also be used in other embodiments. In FIG. 3C, the connection leads 42, 44 are provided from opposite sides of the electrochromic device 50. However, in this embodiment, the connection leads 42, 44 are both contacted to the closest electron conducting layer. In other words, the first connection lead 42 here penetrates the first substrate 22, while the second connection lead 44 penetrates the second substrate 24. This is feasible since the electron conducting layers 12 and 14 always are mechanically supported by the respective substrates 22, 24 all the way into contact with the connection leads 42. A mechanically robust attachment having a small risk for short-circuiting can thus be provided if the electrical attachment is carefully controlled.

Figure 3D:
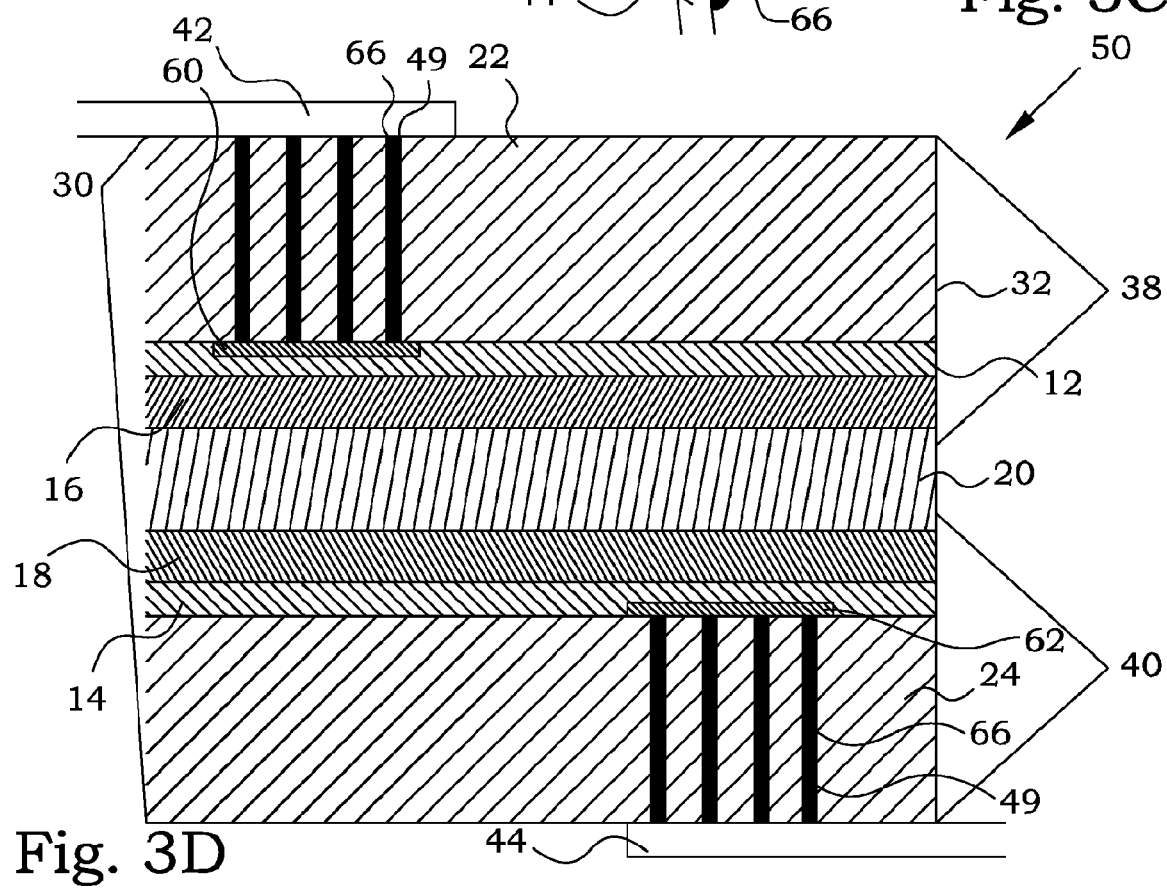

In FIG. 3D, a further embodiment is illustrated. Here, a number of small penetration openings are provided through the substrates 22, 24, ending at a respective bus bar 60, 62. The connection leads 42, 44 are provided at the outer surface of the substrates 22, 24, and solder material 66 connects the connection leads with the bus bars 60, 62. In this embodiment, the part of the connection means that penetrates the substrate is constituted only by the solder material 66. Here, the penetration openings can be very narrow. The connection means penetrating the substrate can alternatively be provided by electroplating or sputtering, e.g. before or simultaneously as the bus bars are provided.

Figure 4:
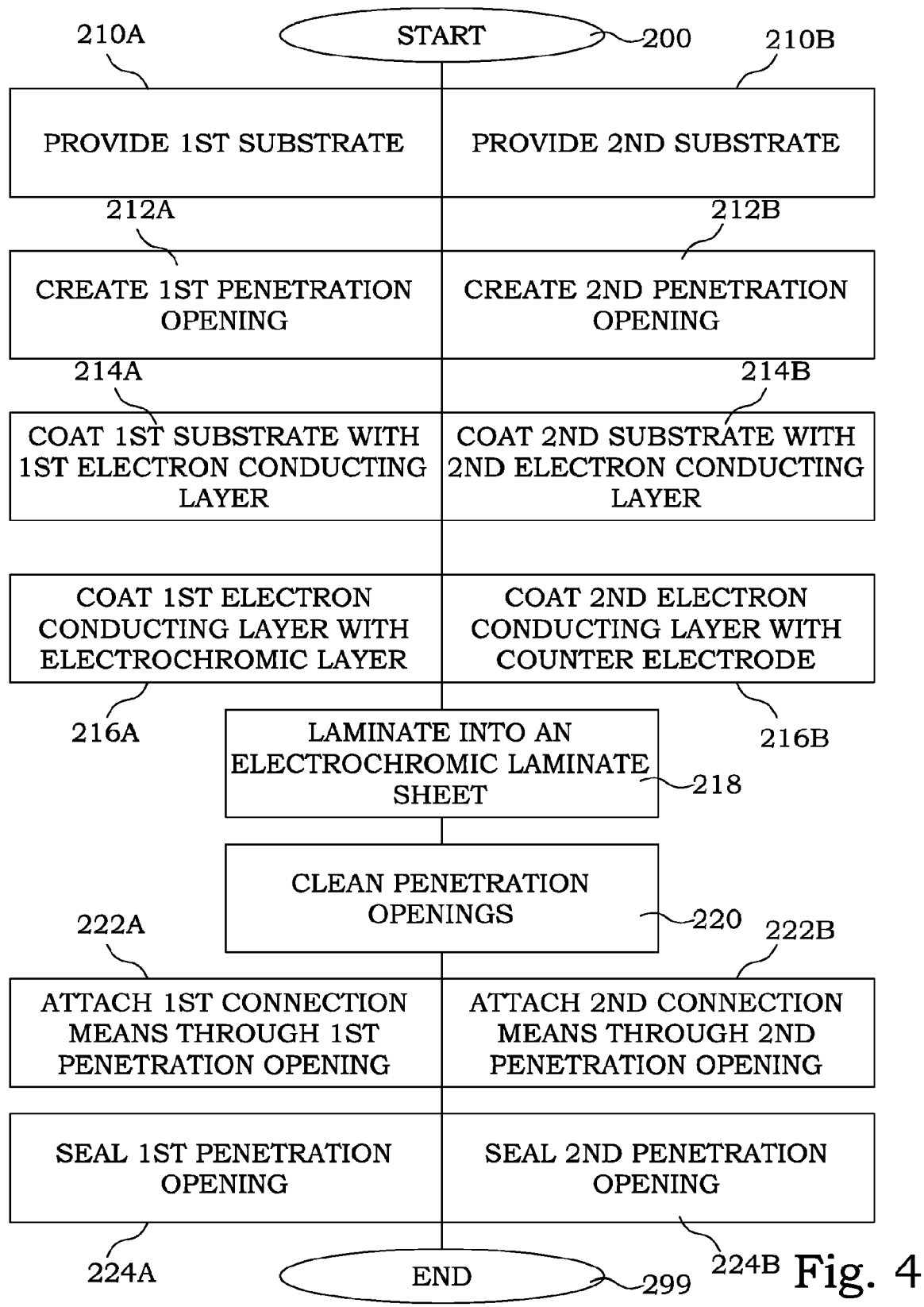
FIG. 4 is a flow diagram illustrating main steps of an embodiment of a manufacturing method according to the present invention.

FIG. 4 illustrates a flow diagram of main steps of an embodiment of a manufacturing method according to the present invention. The process was intended for the manufacturing of a motorcycle helmet visor electrochromic device. However, the process is applicable also to other articles. The process starts in step 200. In step 210A, a first substrate is provided and in step 210B, a second substrate is provided. In the present embodiment, a 175 micrometer thick, 35 by 35 cm large polyester substrate 22 was provided as both the first and second substrates. The thickness has been adapted to commercially available polyester sheets and the lateral size has been adapted to a specific sputter-deposition unit as described further below.

A first penetration opening is created through a substrate, i.e. in different embodiments through said second substrate or through said first substrate, in step 212A and a second penetration opening is created through a substrate, i.e. in different embodiments through said first substrate or through said second substrate, in step 212B. In the present embodiment, the creations of the penetration openings are performed by punching, laser ablation or drilling holes in the substrates. The actual punching procedures are known as such in prior art. However, the application to the particular technical field of the present disclosure and for the particular purpose of the present invention, such punching is not earlier disclosed.

In step 214A, the first substrate is at least partially coated by a first electron conducting layer and in step 214B the second substrate is at least partially coated by a second electron conducting layer. The electron conducting layers in the present embodiment are made of ITO, typically 50-400 nm thick. Due to the existence of the penetration openings in the substrates, and the relative thin electron conducting layers, a corresponding penetration opening will be present also after the coating step. Both electron conducting layers are in the present embodiment deposited by magnetron sputtering. Preferably, the substrates are left uncovered in an area around the penetration openings. This is readily achieved by standard masking techniques. The size of the used sputtering equipment allows a maximum size of substrates of 35 by 35 cm.

In step 216A, the first electron conducting layer is at least partially coated by a first electrochromic layer and in step 216B the second electron conducting layer is coated at least partially by a counter electrode layer. The first electrochromic layer comprises in the present embodiment hydrogen-containing tungsten oxide, typically 50-1000 nm thick. The counter electrode layer in the present embodiment consists of a nickel-based oxide, typically 50-1000 nm thick. Both the first electrochromic layer and the counter electrode layer are deposited by magnetron sputtering. Preferably, the substrates are left uncovered in an area around the penetration openings. This is readily achieved by standard masking techniques. The second substrate coated with the nickel-based oxide layer is in the present embodiment exposed to pretreatment, such as the one disclosed in U.S. Pat. No. 6,500,287, reducing the luminous transmittance of the oxide layer. Thereby, two electrochromic half cells are created.

In the present embodiment, the first electrochromic layer and the counter electrode layer do not cover the entire surface of the respective electron conducting layer. Instead, as mentioned above, bare areas are preferably created at positions that after lamination will face a penetration opening in the opposite substrate. This is in preparation for providing access to the electron conducting layer below. Moreover, also during this process, the penetration openings in the substrates are remaining open.

Figure 5A:
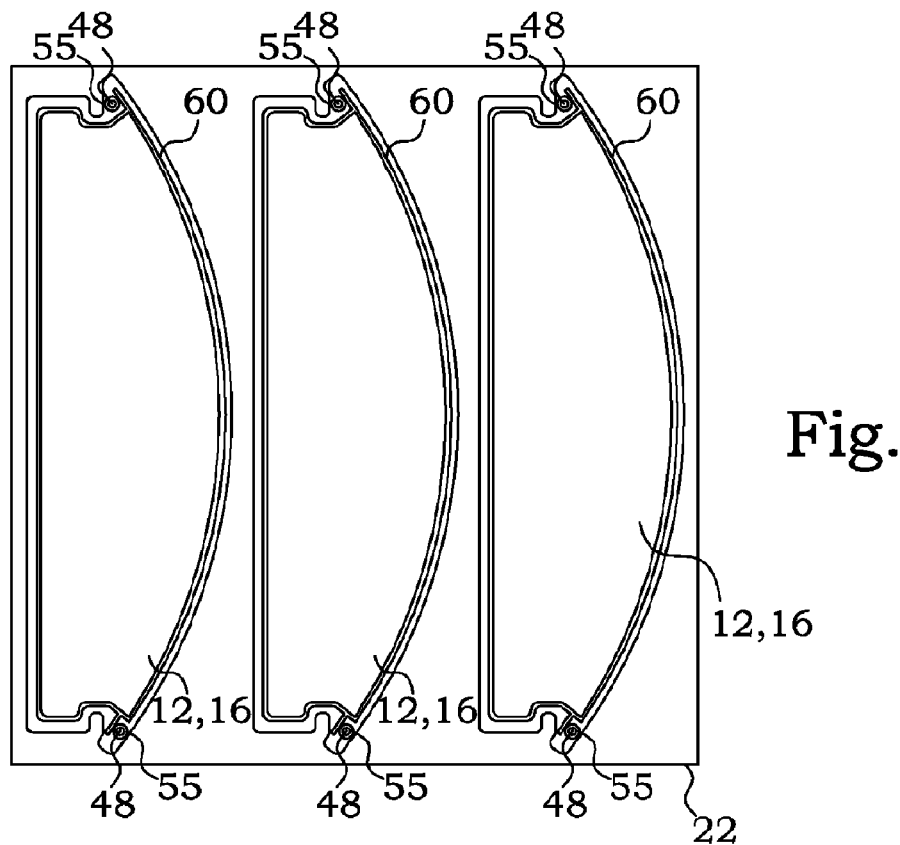
FIGS. 5A-C are schematic illustrations of geometrical relations when laminating two half cells according to embodiments of the present invention.
Figure 5B:
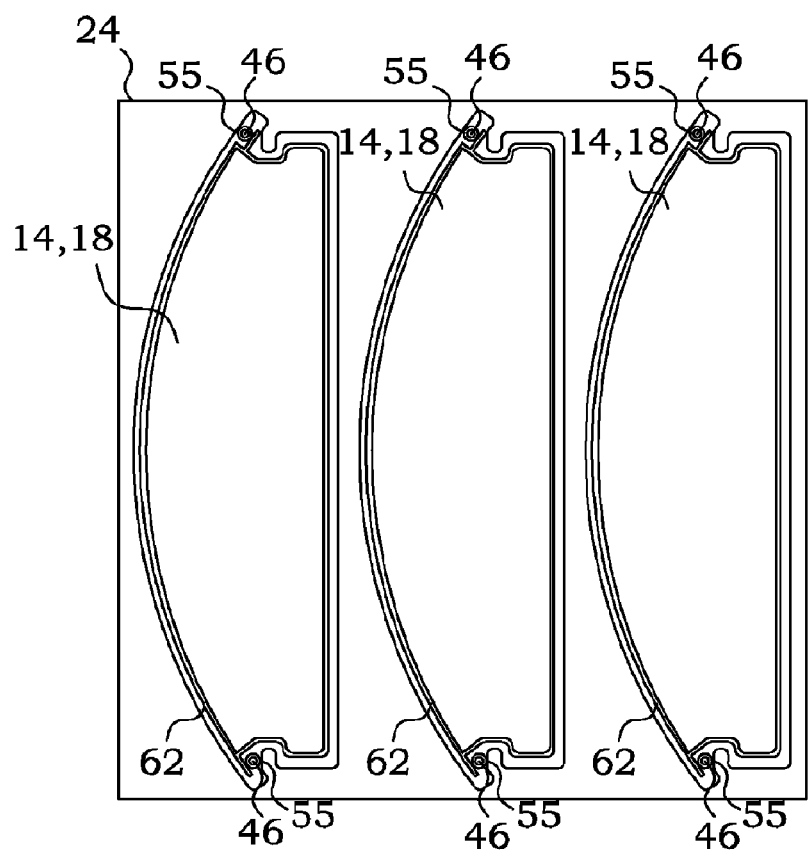
Figure 5C:
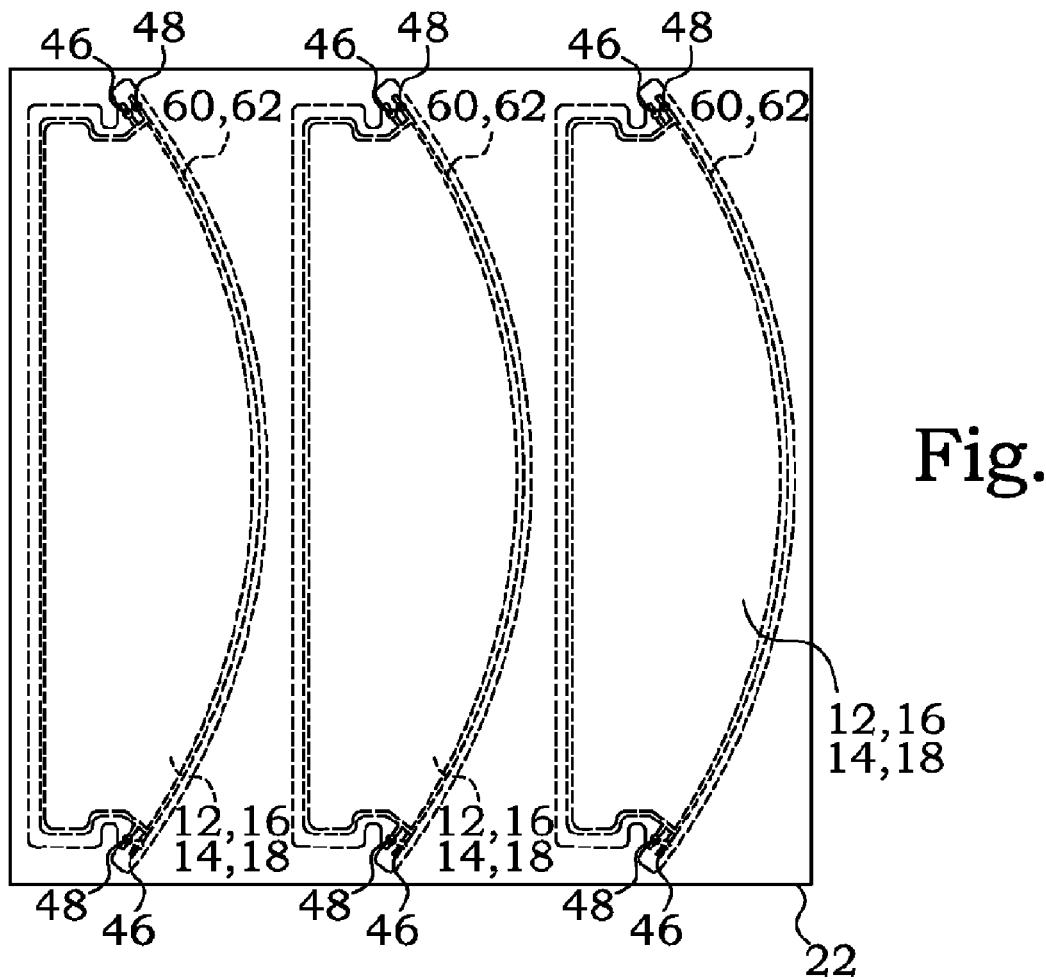

This geometrical relationship is illustrated more in detail in other embodiments in FIGS. 5A-C. In FIG. 5A, a first substrate 22 is coated at certain areas with a first set of bus bars 60, a first electron conducting layer 12 and a first electrochromic layer 16. Two second penetration openings 48 per device are created, and areas 55 are provided around the second penetration openings 48, where the first electrochromic layer 16 and the first electron conducting layer 12 do not cover the substrate 22. Similarly, in FIG. 5B, a second substrate 24 is coated at certain areas with a second set of bus bars 62, a second electron conducting layer 14 and a counter electrode layer 18. Two first penetration openings 46 per device are provided, and areas 55 are provided around the first penetration openings 46, where the counter electrode layer 18 and the second electron conducting layer 14 do not cover the second substrate 24. In a subsequent lamination process, described more in detail below, the two substrates are placed on top of each other. Such a situation is illustrated in FIG. 5C. One can here easily see that the first and second penetration openings 46, 48 coincides with positions where a bus bar 60, 62 is present.

It is now easily understood, that the above steps 212A, 212B of creating the first and second penetration openings 46, 48 preferably creates the penetration openings at different lateral positions. The final electrochromic device 50 is thereby designed having a first penetration point, where the first connection lead 42 is arranged through the second substrate 24, is situated at a different lateral position compared with a second penetration point, where the second connection lead 44 is arranged through the first substrate 22. Moreover, if two second penetration openings 48 and two first penetration openings 46 are created, further manufacturing advantages may be provided, since identical geometries for making the penetration openings can be utilized for both substrates. Furthermore, the same masking geometries may be utilized for both substrates as seen by a comparison between FIGS. 5A and 5B, which facilitates the sputtering process. Multiple attachment points to each electron conducting layers may also be utilized in order to improve the lateral distribution of the applied voltages.

Returning to FIG. 4, in step 218, an electrolyte layer is interposed between the electrochromic half cells. The electrolyte layer covers the substrates at least partially and the entire stack is laminated into an electrochromic laminate sheet. In the present embodiment, a line of a PMMA-based electrolyte is dispensed on one of the substrates, and both substrates are laminated together by roll-pressing to form a laminated sheet with a continuous layer of electrolyte. The electrolyte layer is typically 1-100 micrometer thick in the middle of the laminate sheet. Alternatively, the electrolyte may be applied by screen printing or spraying, which can be advantageous if the electrolyte layer is to be patterned. The electrochromic devices are also edge sealed and cut out and formed into their final shape. A continuous edge seal is thereby created, which lacks any penetration of connection leads.

Instead, in step 220, the penetration openings of the electrochromic devices are cleaned from any electrolyte penetrating into the penetration openings during the lamination process. In the present embodiment, this was performed by simply mechanically removing the electrolyte by a paper tissue tip. In step 222A, a first connection lead is attached electrically to the first electron conducting layer and in step 222B a second connection lead is attached electrically to the second electron conducting layer. This is performed by attaching the first connection lead through the first penetration opening and by attaching the second connection lead through the second penetration opening. The attachment is in the present embodiment performed by ultrasonic soldering. The penetration openings are thereafter sealed in steps 224A and 224B by filling the remaining volume within the penetration openings by a sealing substance, e.g. a silicon based glue or any material typically used as edge seal for electrochromic devices. The procedure ends in step 299.

When manufacturing a device with only one connection lead attached according to the present invention, the steps 220, 222A, 222B, 224A and 224B has to be adapted accordingly, only attaching one of the connection leads. Furthermore, steps for providing attachment of the other connection lead in an alternative manner have to be provided.

In the embodiment of FIG. 4, the procedure of creating penetration openings is performed before the substrates are coated with an electron conducting layer. However, many alternative manufacturing schemes are possible, of which a few are presented here below.

Figure 6:
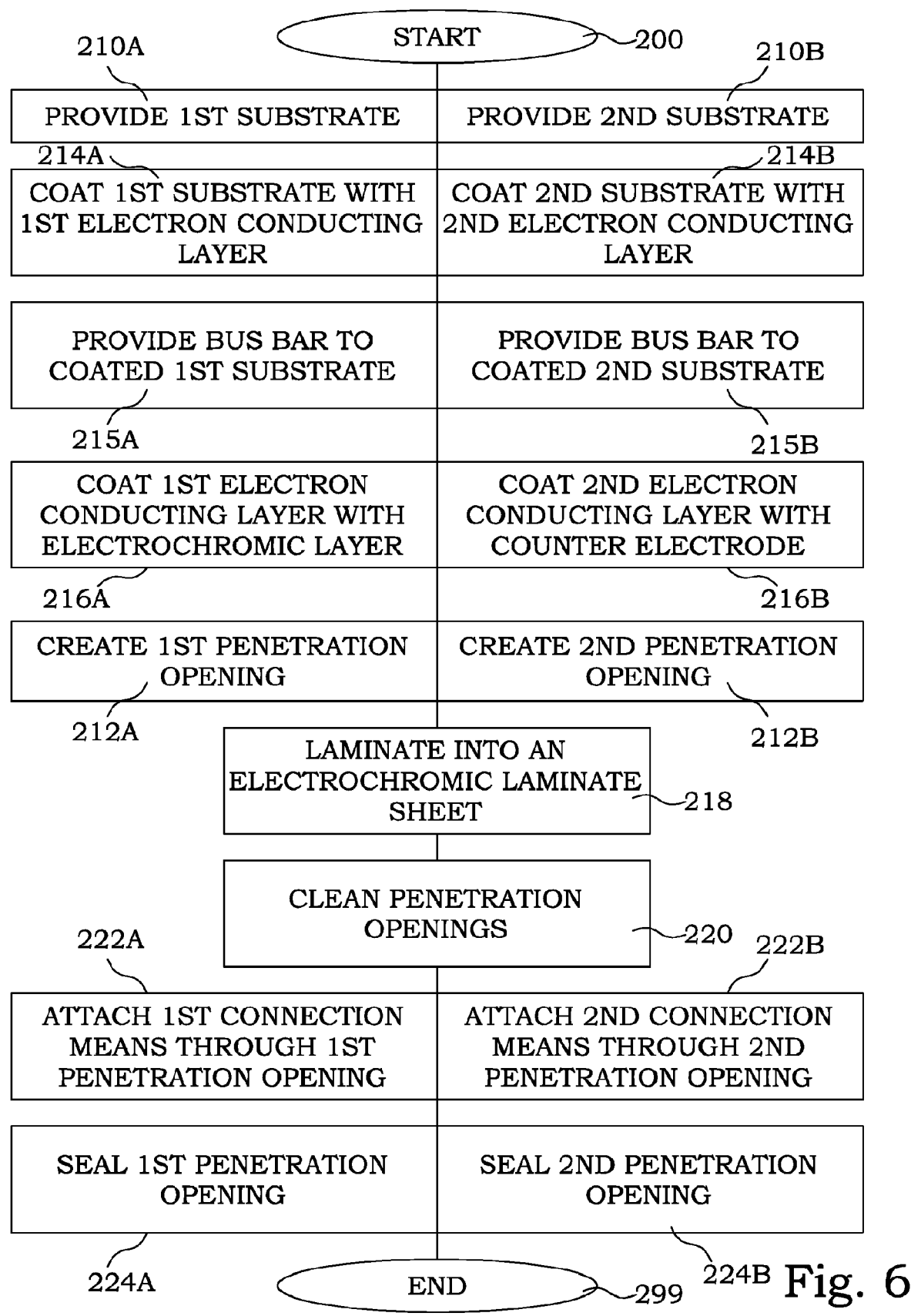
FIG. 6 is a flow diagram illustrating main steps of another embodiment of a manufacturing method according to the present invention.

FIG. 6 illustrates a flow diagram of main steps of another embodiment of a manufacturing method according to the present invention. Many parts are similar as in the embodiment of FIG. 4, and mainly the differences are discussed here. The present embodiment was originally aimed for manufacturing of a ski goggle electrochromic device, however, the principles can be utilized also for other applications as well. The procedure starts in step 200. The substrates are provided in steps 210A and 210B, however, in this embodiment 300 micrometer thick and 35 cm×35 cm large cellulose propionate substrates were provided. The thickness of the cellulose propionate was chosen to fit into a ski goggle frame. Steps 214A and 214B were then performed on the substrates, but without penetration openings. The bus bars are thereafter deposited (steps 215A, 215B) on top of the coated substrates. The electron conducting layer may be considered as composed by a deposited film and the bus bars, however, in the present disclosure they are treated as two separate layers. Steps 216A and 216B were then performed as in the embodiment of FIG. 4. After the provision of the electron conducting layers, bus bars, and electrochromic layer/counter electrode, penetration openings are provided (steps 212A and 212B). The penetration openings in this embodiment are made large enough to allow connection leads to penetrate. In this particular embodiment, penetration openings were cut out in the coated substrates by ultrasonic welding techniques. Also other welding or soldering techniques can be utilized for creating penetration openings in alternative embodiments. Also the portions of the electron conducting layer covering the cut out substrate portions were removed by that action. Steps 218 and 220 were then performed as in the embodiment of FIG. 4. In steps 222A and 222B, the connection leads were attached to the respective electron conducting layers. However, in this embodiment, a gluing technique with electron conducting glue was employed. The glue was also used in the subsequent steps 224A and 224B as the sealing substance. The procedure ends in step 299.

Figure 7:
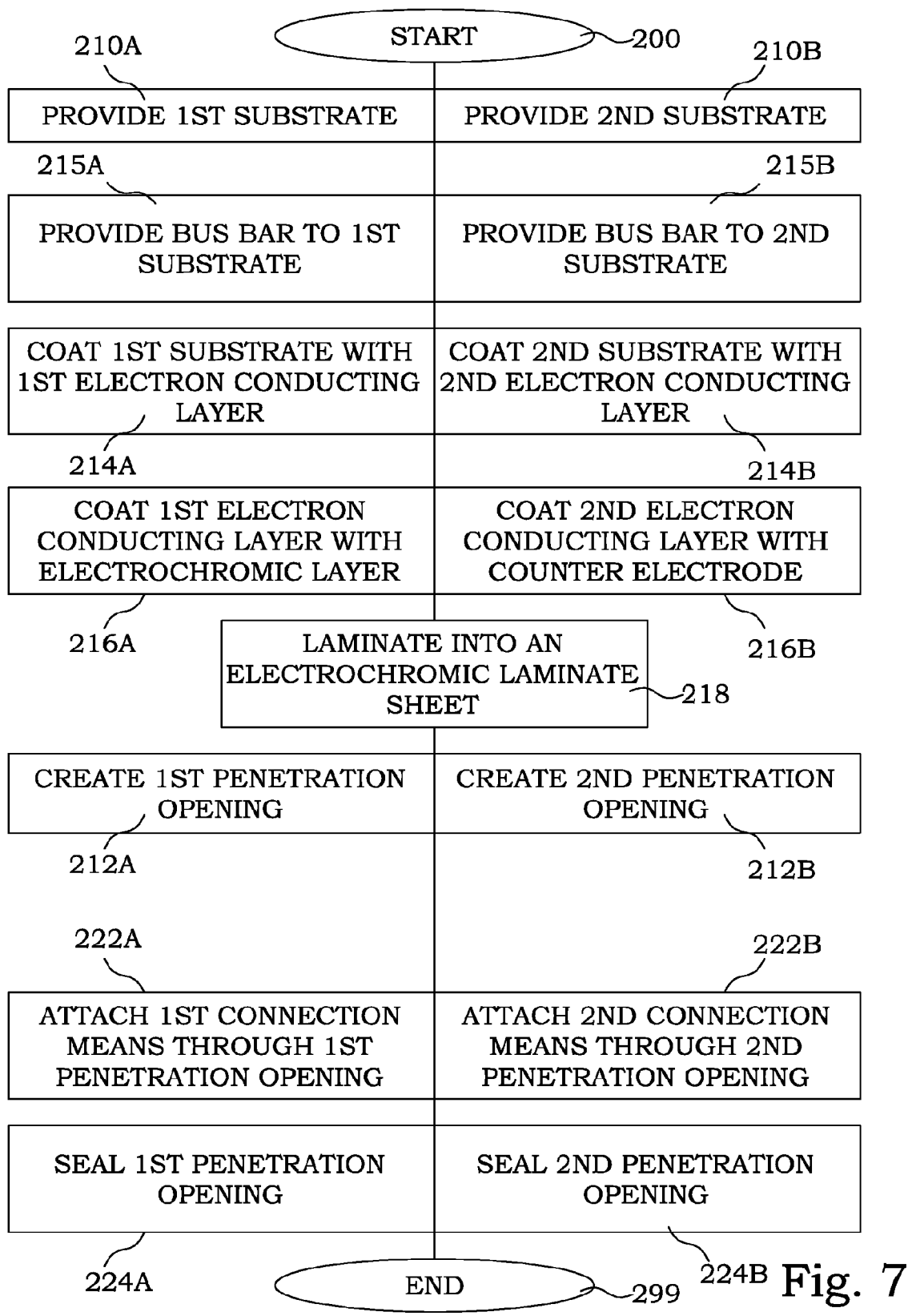
FIG. 7 is a flow diagram illustrating main steps of yet another embodiment of a manufacturing method according to the present invention.

FIG. 7 illustrates a flow diagram of main steps of yet another embodiment of a manufacturing method according to the present invention. The present embodiment was originally aimed for manufacturing of a helmet visor electrochromic device, however, the principles can be utilized also for other applications as well. The procedure starts in step 200. The substrates are provided in steps 210A and 210B, however, in this embodiment 500 micrometer thick and 35 cm×35 cm large cellulose acetate substrates were provided. The thickness of the cellulose acetate was chosen to be suitable for helmet visor applications. In steps 215A and 215B, a respective bus bar layer was provided on top of each substrate. Steps 214A and 214B were then performed on the substrates without penetration openings. In step 216A, the first electrochromic layer was provided on top of the first electron conducting/bus bar layer without any penetration openings in the first substrate and in step 216B a second electrochromic layer was provided on top of the second electron conducting/bus bar layer as counter electrode also without any penetration openings in the second substrate. The two electrochromic layers are intended to cooperate in providing the electrochromic function of the device. However, such function is outside the particular scope of the present disclosure. In step 218, the two half cells are laminated into an electrochromic laminate sheet, edge sealed and cut out into the final shape. After the lamination, steps 212A and 212B are performed, providing penetration openings in the first and second substrates. In the present embodiment, such holes are provided by drilling, welding, punching or laser cutting. Using e.g. a kiss-cutting technique based on a $CO_2$ laser, a hole can be created in the first cellulose acetate substrates, while leaving the other substrate untouched. Connection leads are attached in steps 222A and 222B through the created penetration openings.

Alternatively, penetration means may be provided by sputtering, electroplating or similar techniques. Also in the present embodiment, the leads are attached by ultrasonic welding. Finally in steps 224A and 224B, the remaining volumes of the penetration openings are sealed. The procedure ends in step 299.

This embodiment has the advantage that no separate step of removing electrolyte is necessary. However, instead, the provision of the penetration openings in the laminated sheet requires high-precision operation, which may be difficult to obtain in a non-expensive manner for large production volumes.

Figure 8:
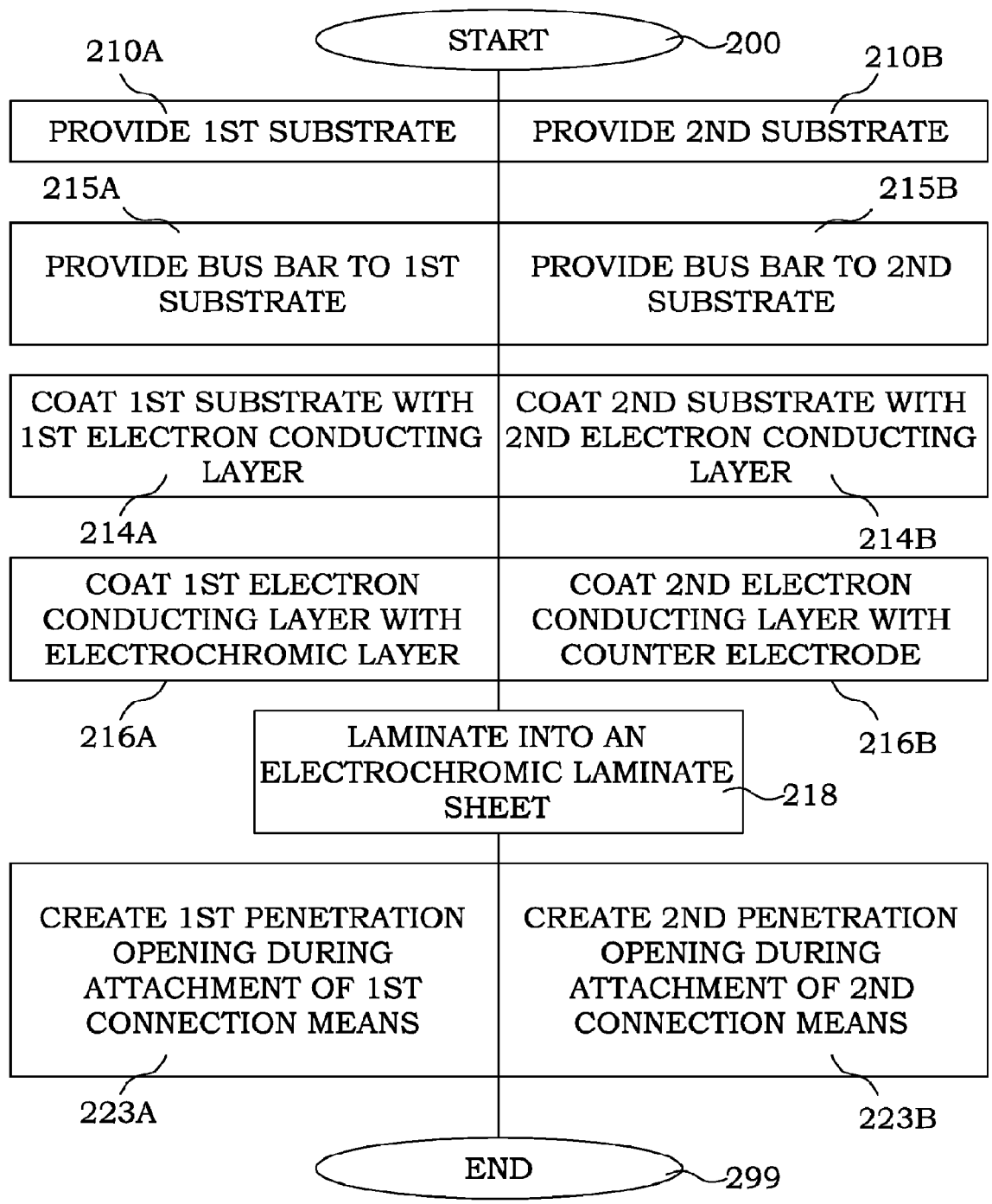
FIG. 8 is a flow diagram illustrating main steps of yet a further embodiment of a manufacturing method according to the present invention.

FIG. 8 illustrates a flow diagram of main steps of yet another embodiment of a manufacturing method according to the present invention. The first part of the flow diagram is the same as in FIG. 7. However, in the present embodiment, the steps of providing the penetration openings are merged with the steps of attaching the connection leads. Thus, after the lamination step 218, in step 223A, a first penetration opening is created by the act of attaching the first connection lead to the first electron conducting layer. This is as described above preferably performed by heating the first connection lead so that it melts the substrate on its way to the first electron conducting layer. The heat is then also used for welding the first connection lead to the first conducting layer. Similarly, in step 223B, a second penetration opening is created by the act of attaching the second connection lead to the first electron conducting layer. In this embodiment, no sealing steps are necessary. The procedure ends in step 299.

The embodiments described above are to be understood as a few illustrative examples of the present invention. It will be understood by those skilled in the art that various modifications, combinations and changes may be made to the embodiments without departing from the scope of the present invention.

The provision of the penetration openings can e.g. be performed essentially at any stage in the manufacturing process, and the choice of when performing the opening providing step depends typically on the selected material and on the application of the electrochromic device in question. The penetration opening providing steps can e.g. also be performed after the step of coating the first and second electron conducting layers, but before laminating. The penetration openings may even be provided at different stages in the manufacturing. For instance, the first substrate may be given its penetration openings before any coating at all is performed, while the second substrate is provided with penetration opening just before lamination, or vice versa. This could be the optimum choice e.g. if different materials are used in the different substrates. The step of providing penetration openings may also be divided into different part steps, in turn being performed at different stages during the manufacturing.

The provision of penetration openings may also be performed simultaneous to the actual provision of the substrate itself. The substrate material could be formed directly with a void volume directly at the manufacturing thereof, and such a procedure can be seen as providing the penetration openings simultaneous to the step of providing the substrates.

In general, different part solutions of the different embodiments can be combined in other configurations, where technically possible. For instance, the first and second electron conducting layers may be contacted according to different principles. The scope of the present invention is, however, defined by the appended claims.

REFERENCES

US 2004/0218247
WO9923528
U.S. Pat. No. 6,500,287

The invention claimed is:

1. An electrochromic device, comprising:
   a first substrate;
   a second substrate;
   a first electron conducting layer at least partially covering said first substrate;
   a second electron conducting layer at least partially covering said second substrate;
   a first electrochromic layer at least partially covering said first electron conducting layer;
   a counter electrode layer at least partially covering said second electron conducting layer;
   an electrolyte layer laminated between and at least partially covering said first electrochromic layer and said counter electrode layer;
   a first connection means electrically connected to said first electron conducting layer; and
   a second connection means electrically connected to said second electron conducting layer,
   said first connection means is arranged through said second substrate as well as said second connection means is arranged through said first substrate.

2. The electrochromic device according to claim 1, wherein a first penetration point where said first connection means is arranged through said second substrate is situated at different lateral position compared with a second penetration point where said second connection means is arranged through said first substrate.

3. The electrochromic device according to claim 1, wherein said first substrate and said second substrate are plastic substrates.

4. The electrochromic device according to claim 1, further comprising a bus bar in electrical contact with at least one of said first electron conducting layer and said second electron conducting layer.

5. The electrochromic device according to claim 4, wherein at least one of said first connection means and said second connection means is attached to said first electron conducting layer and said second electron conducting layer, respectively, via or in the vicinity of one of said bus bars.

6. A method for manufacturing of electrochromic devices, comprising the steps of:
   providing a first substrate;
   providing a second substrate;
   coating said first substrate at least partially by a first electron conducting layer;
   coating said second substrate at least partially by a second electron conducting layer;
   coating said first electron conducting layer at least partially by a first electrochromic layer;
   coating said second electron conducting layer at least partially by a counter electrode layer;
   laminating an electrolyte layer interposed between and at least partially covering said first electrochromic layer and said counter electrode layer into an electrochromic laminate sheet;
   creating a first penetration opening through said first substrate;

creating a second penetration opening through said second substrate;

attaching a first connection means electrically to said first electron conducting layer through said second penetration opening; and attaching a second connection means electrically to said second electron conducting layer through said first penetration opening.

7. The method according to claim 6, wherein said step of creating said second penetration opening creates said second penetration opening at a different lateral position with respect to said first penetration opening.

8. The method according to claim 6, wherein at least one of said step of creating said first penetration opening and said step of creating said second penetration opening is performed before said step of coating said first substrate and said step of coating said second substrate, respectively.

9. The method according to claim 6, wherein at least one of said step of creating said first penetration opening and said step of creating said second penetration opening is performed before said step of laminating.

10. The method according to claim 9, wherein at least one of said step of creating said first penetration opening and said step of creating said second penetration opening is performed between said step of coating said first substrate and said step of coating said first electron conducting layer, and between said step of coating said second substrate and said step of coating said second electron conducting layer, respectively.

11. The method according to claim 6, wherein at least one of said step of creating said first penetration opening and said step of creating said second penetration opening is performed after said step of laminating.

12. The method according to claim 6, wherein at least one of said step of creating said first penetration opening and said step of creating said second penetration opening is comprised in the step of providing a first substrate and a providing a second substrate, respectively, by manufacturing said first substrate and second substrate, respectively, around a volume becoming respective said penetration opening.

13. The method according to claim 6, wherein any of said steps attaching connection means utilises attachment by at least one of ultrasonic soldering and gluing.

14. The method according to claim 6, wherein any of said steps attaching connection means further comprises the step of sealing at least one of said first penetration opening and said second penetration opening.

15. The method according to claim 6, further comprising at least one of the steps of:

providing a bus bar in electrical contact with said first electron conducting layer; and providing a bus bar in electrical contact with said second electron conducting layer.

16. The method according to claim 15, wherein at least one of said first connection means and said second connection means is attached to said first electron conducting layer and said second electron conducting layer, respectively, via or in the vicinity of one of said bus bars.

* * * * *